United States Patent
Wainwright et al.

(10) Patent No.: US 9,944,552 B2
(45) Date of Patent: Apr. 17, 2018

(54) INORGANIC FIBRE COMPOSITIONS

(71) Applicant: Morgan Advanced Materials plc., Windsor, Berkshire (GB)

(72) Inventors: Ronald Wainwright, Wirral (GB); Gary Jubb, Wirral (GB); Fontaine Fadiora, Wirral (GB)

(73) Assignee: Morgan Advanced Materials plc, Windsor, Berkshire (GB)

( * ) Notice: Subject to any disclaimer, the term of this patent is extended or adjusted under 35 U.S.C. 154(b) by 0 days.

(21) Appl. No.: 14/906,977

(22) PCT Filed: Jun. 23, 2014

(86) PCT No.: PCT/GB2014/051912
§ 371 (c)(1),
(2) Date: Jan. 22, 2016

(87) PCT Pub. No.: WO2015/011439
PCT Pub. Date: Jan. 29, 2015

(65) Prior Publication Data
US 2016/0168019 A1   Jun. 16, 2016

(30) Foreign Application Priority Data

Jul. 22, 2013 (GB) .................................. 1313023.2
Jan. 21, 2014 (GB) .................................. 1401006.0

(51) Int. Cl.
| C03C 13/00 | (2006.01) |
| C03C 3/062 | (2006.01) |
| C03C 10/00 | (2006.01) |
| C03C 25/42 | (2006.01) |
| B01J 21/12 | (2006.01) |
| B01J 35/06 | (2006.01) |
| F16D 69/02 | (2006.01) |
| F16L 59/02 | (2006.01) |

(52) U.S. Cl.
CPC .............. *C03C 13/00* (2013.01); *B01J 21/12* (2013.01); *B01J 35/06* (2013.01); *C03C 3/062* (2013.01); *C03C 10/0018* (2013.01); *C03C 13/007* (2013.01); *C03C 25/42* (2013.01); *F16D 69/028* (2013.01); *F16L 59/026* (2013.01); *F16L 59/028* (2013.01)

(58) Field of Classification Search
CPC ......... C03C 3/062; C03C 3/083; C03C 10/00; C03C 10/0018; C03C 13/00; C03C 13/006; C03C 25/002; C03C 25/42
See application file for complete search history.

(56) References Cited

U.S. PATENT DOCUMENTS

| 3,720,526 A | 3/1973 | Duke et al. |
| 4,238,213 A | 12/1980 | Pallo et al. |
| 4,504,957 A | 3/1985 | McClelland et al. |
| 4,578,918 A | 4/1986 | Yost et al. |
| 4,690,690 A | 9/1987 | Andrew et al. |
| 4,867,779 A | 9/1989 | Meunier et al. |
| 5,037,470 A | 8/1991 | Matzen et al. |
| 5,108,957 A | 4/1992 | Cohen et al. |
| 5,250,269 A | 10/1993 | Langer |
| 6,235,136 B1 | 5/2001 | Kittson et al. |
| 6,284,684 B1 | 9/2001 | Vignesoult et al. |
| 6,300,262 B1 | 10/2001 | Beall |
| 6,313,050 B1 | 11/2001 | De Meringo et al. |
| 6,726,884 B1 | 4/2004 | Dillon et al. |
| 6,897,173 B2 | 5/2005 | Bernard et al. |
| 7,803,729 B2 | 9/2010 | Keller et al. |
| 8,088,701 B2 | 1/2012 | Jubb |
| 8,182,751 B2 | 5/2012 | Shirk et al. |
| 2002/0086796 A1 | 7/2002 | Eckardt et al. |
| 2002/0169231 A1 | 11/2002 | Okayama et al. |
| 2003/0015003 A1 | 1/2003 | Fisler et al. |
| 2003/0181306 A1 | 9/2003 | Bernard et al. |
| 2004/0116268 A1 | 6/2004 | Kobayashi et al. |
| 2005/0272602 A1 | 12/2005 | Nomiya et al. |
| 2006/0211562 A1 | 9/2006 | Fisler |
| 2008/0191179 A1 | 8/2008 | Bernard et al. |
| 2010/0055457 A1* | 3/2010 | Jubb .................. C03C 13/00 428/401 |

(Continued)

FOREIGN PATENT DOCUMENTS

| CN | 1225426 | 11/2005 |
| CN | 101541699 | 9/2009 |

(Continued)

OTHER PUBLICATIONS

Cattell et al., The Crystallization of an aluminosilicate glass in the K2O—Al2O3—SiO2 system, 2005, Elsevier, Dental Materials, vol. 21, pp. 811-822. (Year: 2005).*
GB Application No. 1313023.2, Combined Search and Examination Report dated Jan. 17, 2014, 5 pages.
International Patent Application No. PCT/GB2014/051912, Search Report and Written Opinion dated Oct. 9, 2014.
China Patent Application No. 201480041372.7, English Translation of Office Action dated Apr. 19, 2017.
Japan Patent Application No. 2016-528597, English Translation of Office Action dated Apr. 25, 2017.
Russia Patent Application No. 2016105765, English Translation of Office Action dated Jul. 24, 2017.
McMillan, *Microcrystalline Glass (Glass Ceramics)*, Aug. 1988, pp. 63-64, China Architecture & Building Press.

(Continued)

*Primary Examiner* — Elizabeth A. Bolden
(74) *Attorney, Agent, or Firm* — Kilpatrick Townsend & Stockton LLP; Dean W. Russell; Kristin M. Crall (57) ABSTRACT

Inorganic fibers having the composition: $10 \leq Al_2O_3 \leq 50$ mol %; $2 \leq K_2O \leq 40$ mol %; $30 \leq SiO_2 \leq 70$ mol %; and in which $SiO_2 + Al_2O_3 + K_2O >= 80$ mol % can be protected against surface crystallization of kalsilite by: including an amount of a nucleation promoting component effective to promote bulk crystallization in the glass; and/or providing on at least part of their surface, potassium scavenging materials.

42 Claims, 9 Drawing Sheets

(56) References Cited

U.S. PATENT DOCUMENTS

| | | |
|---|---|---|
| 2010/0203284 A1 | 8/2010 | Kanai |
| 2010/0264352 A1* | 10/2010 | Jubb .................. C03C 13/00 252/62 |
| 2011/0259241 A1 | 10/2011 | Sugiura et al. |
| 2012/0095149 A1 | 4/2012 | Sawanoi et al. |
| 2012/0100983 A1 | 4/2012 | Yonaiyama et al. |
| 2012/0247156 A1 | 10/2012 | Kitahara et al. |
| 2012/0247695 A1 | 10/2012 | Mihara et al. |
| 2012/0248367 A1 | 10/2012 | Kishiki et al. |
| 2012/0252295 A1 | 10/2012 | Ishihara et al. |
| 2013/0090224 A1 | 4/2013 | Iwata et al. |
| 2013/0225391 A1 | 8/2013 | Iwata et al. |
| 2014/0342115 A1 | 11/2014 | Sakane et al. |
| 2014/0370284 A1 | 12/2014 | Nakajima et al. |
| 2014/0378596 A1 | 12/2014 | Yonaiyama et al. |
| 2015/0013283 A1 | 1/2015 | Ota et al. |
| 2015/0013284 A1 | 1/2015 | Ota et al. |

FOREIGN PATENT DOCUMENTS

| | | |
|---|---|---|
| DE | 3427918 | 1/1986 |
| EP | 2634308 | 9/2013 |
| EP | 2765380 | 8/2014 |
| FR | 2864828 | 7/2005 |
| GB | 1042782 | 9/1966 |
| GB | 1053782 | 1/1967 |
| JP | 06144863 | 5/1994 |
| JP | 2006306713 | 11/2006 |
| JP | 2011207626 | 10/2011 |
| JP | 2011241092 | 12/2011 |
| JP | 5616578 | 10/2014 |
| SU | 525634 | 8/1976 |
| WO | 1997031870 | 9/1997 |
| WO | 2003050054 | 6/2003 |
| WO | 2005035895 A1 | 4/2005 |
| WO | 2005110578 | 11/2005 |
| WO | 2006004974 | 1/2006 |
| WO | 2007005836 | 1/2007 |
| WO | 2007143067 | 12/2007 |
| WO | 2008065363 | 6/2008 |
| WO | 2008136875 | 11/2008 |
| WO | 2009032147 | 3/2009 |
| WO | 2009032191 | 3/2009 |
| WO | 2009066076 | 5/2009 |
| WO | 2009126593 | 10/2009 |
| WO | 2010024920 | 3/2010 |
| WO | 2010074711 | 7/2010 |
| WO | 2010077360 | 7/2010 |
| WO | 2010092668 | 8/2010 |
| WO | 2010120380 | 10/2010 |
| WO | 2010122337 | 10/2010 |
| WO | 2011019377 | 2/2011 |
| WO | 2011019394 | 2/2011 |
| WO | 2011019396 | 2/2011 |
| WO | 2011037617 | 3/2011 |
| WO | 2011037634 | 3/2011 |
| WO | 2011040968 | 4/2011 |
| WO | 2011060259 | 5/2011 |
| WO | 2011060421 | 5/2011 |
| WO | 2011067598 | 6/2011 |
| WO | 2011083695 | 7/2011 |
| WO | 2011083696 | 7/2011 |
| WO | 2011084475 | 7/2011 |
| WO | 2011084487 | 7/2011 |
| WO | 2011084558 | 7/2011 |
| WO | 2011133778 | 10/2011 |
| WO | 2011159914 | 12/2011 |
| WO | 2012021270 | 2/2012 |
| WO | 2012021817 | 2/2012 |
| WO | 2012049858 | 4/2012 |
| WO | 2012065052 | 5/2012 |
| WO | 2012068427 | 5/2012 |
| WO | 2012132271 | 10/2012 |
| WO | 2012132287 | 10/2012 |
| WO | 2012132327 | 10/2012 |
| WO | 2012132329 | 10/2012 |
| WO | 2012132469 | 10/2012 |
| WO | 2012148468 | 11/2012 |
| WO | 2012148469 | 11/2012 |
| WO | 2013015083 | 1/2013 |
| WO | 2013046052 | 4/2013 |
| WO | 2013074968 | 5/2013 |
| WO | 2013080455 | 6/2013 |
| WO | 2013080456 | 6/2013 |
| WO | 2013094113 | 6/2013 |
| WO | 2013145243 | 10/2013 |
| WO | 2013145245 | 10/2013 |

OTHER PUBLICATIONS

*Encyclopedia of Materials Science and Technology*, Editorial Committee of Encyclopedia of Materials Science and Technology, Aug. 1995, pp. 68-69, Encyclopedia of China Publishing House.

Wang et al., *Handbook of Glass Materials*, Jan. 2008, p. 674, Chemical Industry Press.

Pavlushkin, *Foundations of Sitall Technology*, 1979, pp. 103, 126, 134, 135, 138.

Holand et al., *Glass-Ceramic Technology*, 2002, ISBN 1-57498-107-2.

Kalinin et al., *Crystallized Glasses Based on Cordierite*, 1964, pp. 175-176, Catalyzed Crystallization of Glass, The Structure of Glass, vol. 3.

Roy, *Metastable Liquid Immiscibility and Subsolidus Nucleation*, Dec. 1960, pp. 670-671, Journal of the American Chemical Society—Discussions and Notes.

Podushko et al., *Mechanism of the Catalyzed Crystallization of Glasses in the Li2O—Al2O3—SiO2 System With Titanium Dioxide*, 1964, pp. 77-82, 1964.

Rabinovich, *Influence of Crystal-Chemical Similarity on Heterogeneous Crystallization of Glasses*, 1964, pp. 21-26, Catalyzed Crystallization of Glass, The Structure of Glass, vol. 3.

\* cited by examiner

INORGANIC FIBRE COMPOSITIONS

CROSS REFERENCE TO RELATED APPLICATIONS

The present application is the U.S. national phase entry of International Patent Application No. PCT/GB2014/051912 filed on Jun. 23, 2014, which application claims priority benefit of United Kingdom Patent Application No. 1313023.2 filed on Jul. 22, 2013 and United Kingdom Patent Application No. 1401006.0 filed on Jan. 21, 2014, each of which are hereby incorporated by reference in their entireties.

This invention relates to inorganic fibre compositions, and in particular to potassium aluminosilicate fibres of the type disclosed in International Application No. WO2008/065363.

Fibrous materials are well known for their use as thermal and/or acoustic insulating materials and are also known for their use as strengthening constituents in composite materials such as, for example, fibre reinforced cements, fibre reinforced plastics, and as a component of metal matrix composites. Such fibres may be used in support structures for catalyst bodies in pollution control devices such as automotive exhaust system catalytic converters and diesel particulate filters and may be used in the catalyst bodies themselves. Such fibres may be used as a constituent of friction materials [e.g. for automotive brakes]. The fibres of the present invention have a range of properties and may be usable in any or all of these applications depending on the properties shown.

WO2008/065363 discloses inorganic fibres having a composition comprising predominantly or exclusively $Al_2O_3$, $K_2O$, and $SiO_2$. WO2008/065363 disclosed that magnesium can be useful as a viscosity modifier in such fibres.

Crystallisation of large crystals is a problem in a fibre, since the boundaries between crystals comprise regions of weakness, and if the crystals are large enough that they extend across a significant part of fibre diameter the fibre will be significantly weaker than the bulk strength of the fibre material would indicate.

WO2009/066076 discloses the use of magnesium and/or boron as additives in inorganic fibres having a composition comprising predominantly or exclusively $Al_2O_3$, $K_2O$, and $SiO_2$. Magnesium was disclosed as a beneficial additive in low quantities, as magnesium acts as a grain refining agent, reducing the effect on the fibres of crystallisation of large crystals.

In both WO2008/065363 and WO2009/066076 it was mentioned that zirconium oxide and iron oxide could be tolerated in small amounts [with maximum amounts disclosed of 0.1 wt % and 0.2 wt % respectively].

The fibres of both WO2008/065363 and WO2009/066076 are useful, but the applicants have found that some are liable to reduction in strength through one or both of two mechanisms.

In a first mechanism, the fibres may fracture due to cracks and defects induced through repeated short term exposures to temperatures above, for example, 1000° C. This behaviour appears associated with differential coefficients of thermal expansion between the as-made glassy material and crystallised material leading to stresses that produce "pinholes" in the fibre.

The applicants have determined that magnesium addition on its own, disclosed in WO2009/066076 as being useful to provide grain refinement, appears to contribute to failure through the "pinhole" mechanism [although presence of magnesium is not required for pinholes to occur].

In a second mechanism, exposure to high temperatures [e.g. 1250° C. or more] leads over time to the production of large plate-form crystals, high in alumina, which lead to loss in strength of the fibres. This mechanism of fibre degradation proceeds faster as temperature is raised.

Devitrification [complete or partial crystallisation] of glasses is initiated by nuclei being present, or forming, in the glass. Nuclei may comprise crystalline regions that act as "seeds" for further crystal growth or may comprise discontinuities [e.g. the surface of the glass, cracks in the glass, or internal phase boundaries]. In a glass fibre the ratio of surface to volume is high, and the surface may comprise flaws. It has been found that potassium aluminosilicate fibres such as those disclosed in WO2008/065363 and WO2009/066076, and indeed many alkali metal or alkaline earth aluminosilicates, tend to crystallise from the surface of the fibre, with crystals growing from the surface towards the core of the fibre.

The applicants have found that inclusion of one or more nucleation promoting components in an amount sufficient to cause bulk crystallisation can overcome the problem of pinholes in potassium aluminosilicate fibres. By "bulk crystallisation" is meant crystallisation initiated within the body of the fibre: this is to be contrasted with "surface crystallisation" meaning crystallisation initiated from the surface.

The component capable of promoting nucleation may be any as are conventionally known in the glass art, but transition metals and lanthanides may be effective as may phosphate. In the context of this application, the term "transition metal and/or lanthanide element oxides" means any one or more of the elements Sc; Ti; V; Cr; Mn; Fe; Co; Ni; Cu; Y; Zr; Nb; Mo; Ru; Rh; Pd; Ag; La; Hf; Ta; W; Re; Os; Ir; Pt; Au; Ce; Pr; Nd; Sm; Eu; Gd; Tb; Dy; Ho; Er; Tm; Yb; Lu.

Zirconia is a preferred nucleation promoting component but other components [e.g. titania, ceria, and phosphate] are contemplated as are mixtures of nucleation promoting components provided the overall amount favours bulk crystallisation.

Without restricting to any particular mechanism, the nucleation promoting components may provide crystalline nuclei that promote nucleation; or may promote phase separation to form a phase separated glass, such that nucleation occurs at interfaces between phases; or both.

Surprisingly, the applicants have also found that for such bulk crystallised compositions, the presence of magnesia can be beneficial, contrary to its detrimental effect in fibres not containing such components. Magnesia reduces the formation of the large plate form crystals and also has the effect of accelerating crystallisation, which can be useful for producing controlled quantities of crystallisation in the production process.

The applicants have further discovered that potassium migration at elevated temperatures can provide additional failure mechanisms for fibres, and have found that potassium scavengers, in particular silica sources, mitigate such additional failure mechanisms.

Accordingly, in a first aspect, the present invention provides potassium aluminosilicate fibres formed as a glass comprising a nucleation promoting component in an amount sufficient to cause bulk crystallisation in the glass. By promoting bulk crystallisation, stresses caused by surface crystallisation are reduced or eliminated as is explained further below. The present invention further provides a method of making potassium aluminosilicate fibres as a glass, characterised in that the melt is of a composition such that on devitrification the glass undergoes bulk crystallisation.

The applicants have further found that the detrimental effect of surface crystallisation of the phases normally found in potassium aluminosilicate fibres can be mitigated by providing on at least part of their surface one or more potassium scavenging materials, which advantageously comprise one or more sources of silica.

Accordingly, in a second aspect, the present invention provides inorganic fibres formed as a glass having a composition comprising:

10≤$Al_2O_3$≤50 mol %;
12≤$K_2O$≤40 mol %;
30≤$SiO_2$≤70 mol %;

the fibres bearing on at least part of their surface one or more potassium scavenging materials, which advantageously comprise one or more sources of silica.

Further aspects of the invention will be evident from the claims. The scope of the claimed invention is as set out in the claims, and the scope thereof is incorporated into this description by reference.

Further features of the invention are as set out in the appended claims and exemplified in the following description and the drawings in which:

For the avoidance of doubt it should be noted that in the present specification the term "comprise" in relation to a composition is taken to have the meaning of include, contain, or embrace, and to permit other ingredients to be present. The terms "comprises" and "comprising" are to be understood in like manner. It should also be noted that no claim is made to any composition in which the sum of the components exceeds 100%.

Where a patent or other document is referred to herein, its content is incorporated herein by reference to the extent permissible under national law.

Further it should be understood that usage in compositions of the names of oxides [e.g. alumina, silica, potassia, zirconia] does not imply that these materials are supplied as such, but refers to the composition of the final fibre expressing the relevant elements as oxides. The materials concerned may be provided in whole or in part as mixed oxides, compounded with fugitive components [e.g. supplied as carbonates] or indeed as non-oxide components [e.g. as halides].

If materials comprising fugitive components [such as carbonates] are used, it can be important to ensure that the fugitive component is removed before fibre formation, as otherwise porosity may form in the fibres, which is detrimental to fibre strength. This removal may take place in the melt, on the surface of the melt, or before the component is introduced to the melt. In the last case, this may include a calcination step.

Fibres according to the invention and comparative fibres described herein have been produced at either the Mexican production facilities of one of the applicant's subsidiaries in Pachuca, Mexico by spinning [made from the melt by forming a molten stream and converting the stream into fibre by permitting the stream to contact one or more spinning wheels]; or at the applicant's research facilities in Bromborough, England by spinning or alternatively by blowing [fibres made from the melt by forming a molten stream and converting the stream into fibre by using an air blast directed at the stream].

The invention is not limited to any particular method of forming the fibres from the melt, and other methods [e.g. rotary or centrifugal formation of fibres; drawing; air jet attenuation] may be used. The compositions described herein and other potassium aluminosilicate fibres [including those of WO2008/065363 and WO2009/066076.] may also be made by sol-gel methods, and such fibres may avoid the problems that flow from formation from a melt.

First Comparative Fibre

Figure 1:
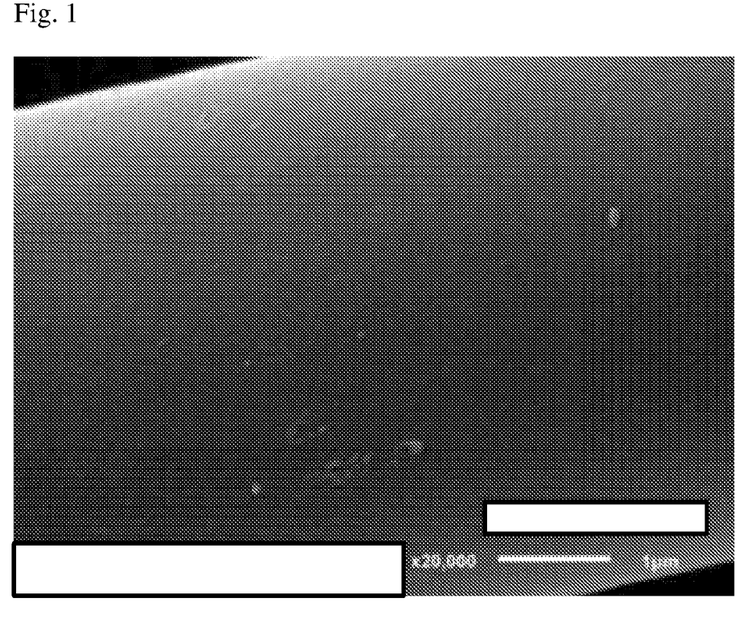
FIG. 1 is a micrograph of a first comparative fibre as manufactured having an approximate composition 25 wt % $K_2O$; 40 wt % $Al_2O_3$; 35 wt % $SiO_2$ [~21.4 mol % $K_2O$; 31.6 mol $Al_2O_3$; 47 mol % $SiO_2$]

Relatively smooth, essentially featureless fibres can be produced of potassium aluminosilicate glass as claimed in WO2008/065363 as indicated in FIG. 1 for a fibre having an approximate composition 25 wt % $K_2O$; 40 wt % $Al_2O_3$; 35 wt % $SiO_2$ [~21.4 mol % $K_2O$; 31.6 mol $Al_2O_3$; 47 mol % $SiO_2$].

Figure 2:
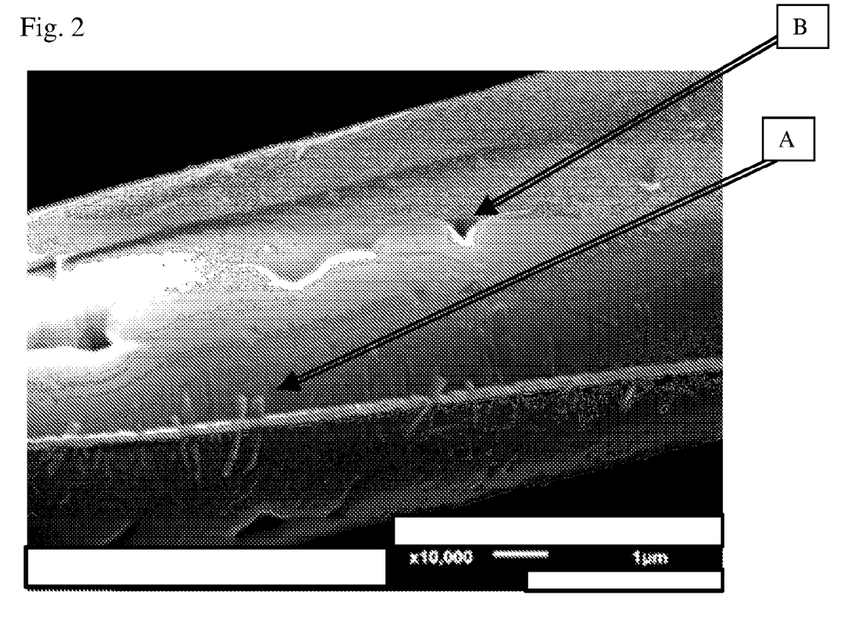
FIG. 2 is a micrograph of fibre of the same comparative fibre as FIG. 1 after exposure to 1250° C. for 250 hours.
Figure 3:
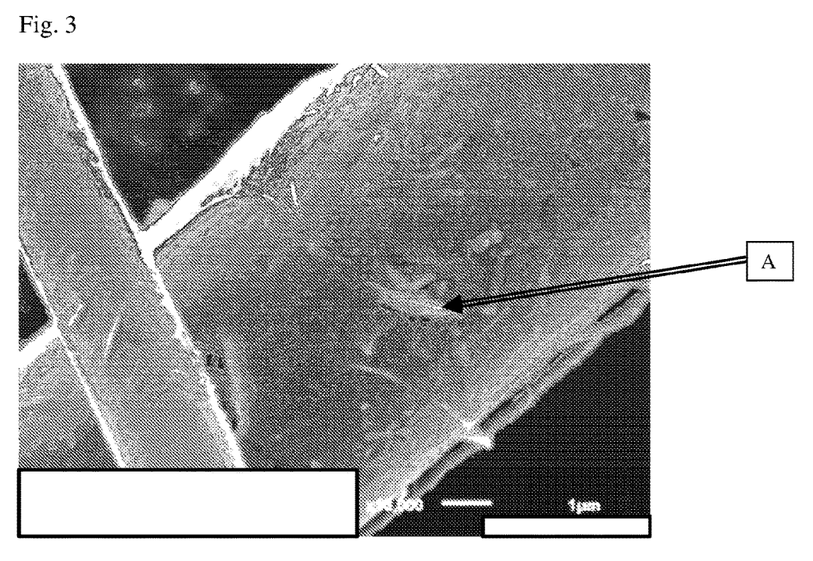
FIG. 3 is a micrograph of fibre of the same comparative fibre as FIG. 1 after exposure to 1250° C. for 1000 hours.

After exposure to 1250° C. [250 hours FIG. 2; 1000 hours FIG. 3] such fibres show some crystallisation with hexagonal crystals [high in alumina] being formed [see arrows "A" in FIGS. 2 and 3]. The particular fibre shown in FIG. 2 shows evidence that fugitive components were not removed before fibre formation and shows pits where such components have escaped to the surface [see arrows "B" in FIGS. 2 and 8].

Second Comparative Fibre

A fibre comprising MgO and $ZrO_2$ as additives had the approximate composition 25.5 wt % $K_2O$; 37.5 wt % $Al_2O_3$; 35 wt % $SiO_2$ 1.1 wt % MgO; and 0.8 wt % $ZrO_2$ [~21.6 mol % $K_2O$; 29.3 mol % $Al_2O_3$; 46.5 mol % $SiO_2$ 2.2 mol % MgO; and 0.4 mol % $ZrO_2$]. Compressed fibre modules were made from this fibre and installed in the door of a kiln having a 20 hour cycle comprising slow heating [<75° C./hour] to 600° C.
faster heating [~200° C./hour] to 1180° C.
~40 minutes at 1180° C.
cooling [~250° C./hour] to 700° C.
slower cooling [~250° C./hour] to 50° C.

This gave an approximate time at temperatures above 1000° C. of 2.3 hours.

Figure 4:
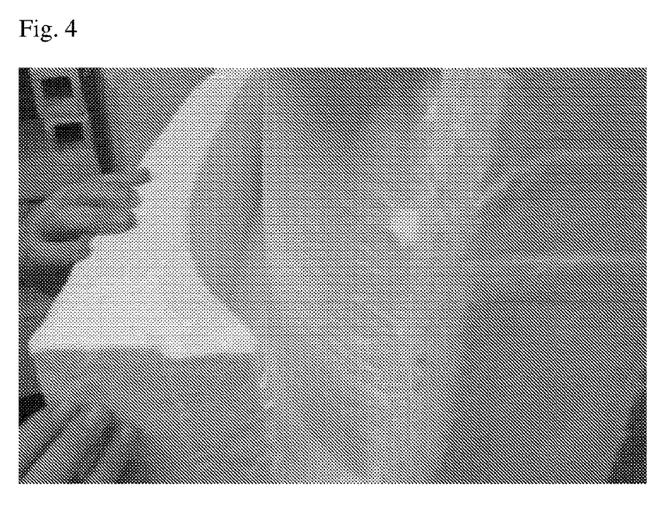
FIG. 4 is a photograph of a fibre module showing shearing due to fibre breakdown under cyclic conditions of a second comparative trial fibre of the approximate composition 25.5 wt % $K_2O$; 37.5 wt % $Al_2O_3$; 35 wt % $SiO_2$ 1.1 wt % MgO; and 0.8 wt % $ZrO_2$ [~21.6 mol % $K_2O$; 29.3 mol % $Al_2O_3$; 46.4 mol % $SiO_2$ 2.2 mol % MgO; and 0.5 mol % $ZrO_2$].

As can be seen from FIG. 4, the module sheared along a curve. This curve appeared to approximate a plane of equal temperature corresponding generally to a temperature indicating the onset of crystallisation, and so the applicant analysed the fibres in greater detail.

It was found that kalsilite was present in the fibres and that the fibres in the region of shear showed different morphologies according to size. Coarse fibres [e.g. >10 μm diameter] tended to show longitudinal cracks; mid-range fibres [e.g. 5-10 μm diameter] tended to show surface flaws and finer fibres [e.g. <5 μm diameter] tended to be free of flaws. [These diameter ranges are illustrative only and there is a spectrum of behaviour from fault free fine fibres to cracked coarse fibres].

The amorphous glassy material of the as-made fibres has a density of ~2.5 g·cm$^{-3}$; kalsilite has a density reported in the range 2.6-2.62 g·cm$^{-3}$. The applicants postulate [without wishing to be bound to any theory] that:

as the fibres are exposed to temperatures at which devitrification can occur, this takes place preferentially at the surface of the fibres, initially leading to a devitrified surface and glassy core;

the mismatch between the density of the glassy material of the as-made fibre and that of kalsilite results in the surface being put under strain;

for small diameter fibres devitrification at the surface will affect a significant proportion of the fibre diameter and small diameter fibres can accommodate this strain in both the devitrified surface and the glassy core of the fibre; whereas with progressively larger diameter fibres the devitrified portion will occupy a lesser proportion of the fibre diameter and so need to accommodate more of the strain;

prolonged time at temperature permits the release of that strain and the healing of flaws in an annealing process;

whereas short repeated exposures do not have this effect so that the larger diameter fibres crack and/or exhibit surface flaws leading to weakness in the fibre that in a body of fibre (e.g. blanket or modules, including folded blanket modules and blocks) can result in a "soft zone" of reduced mechanical strength.

Figure 5:
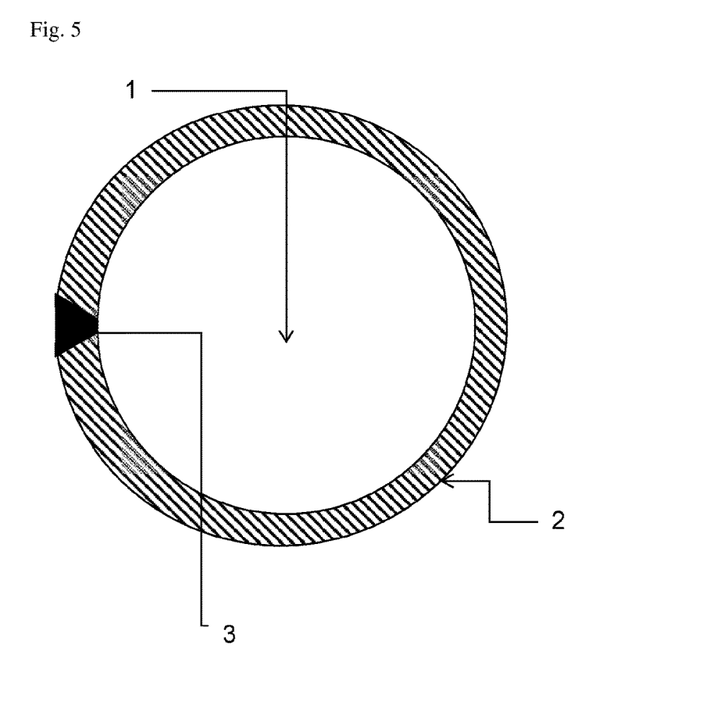
FIG. 5 is a sketch indicating the formation of surface flaws on surface devitrification of a fibre.
Figure 6:
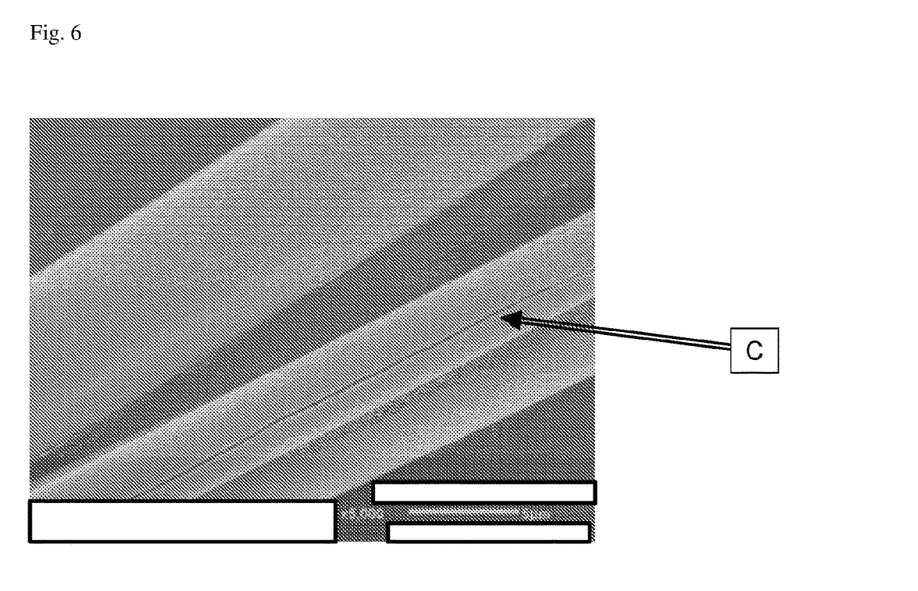
FIG. 6 is a micrograph of a comparative fibre showing a surface flaw.
Figure 8:
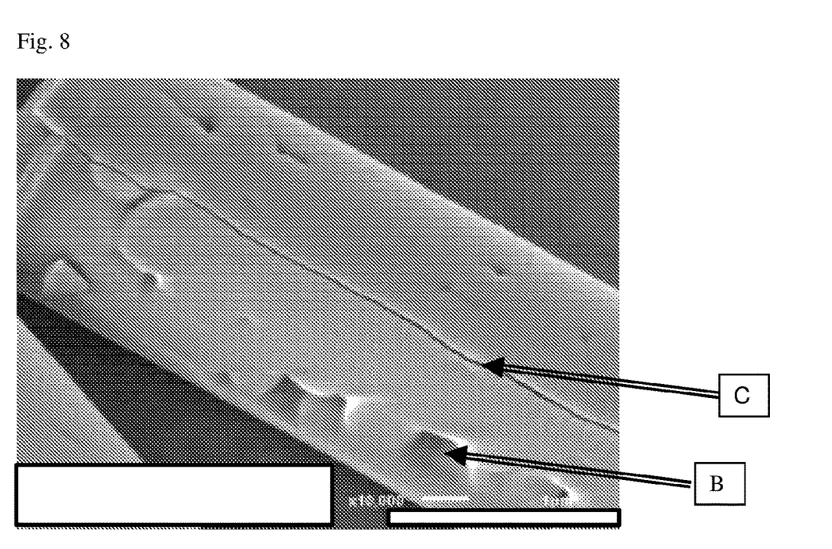
FIG. 8 is a micrograph of a fibre of the composition of FIG. 7

This effect is shown schematically in FIG. 5 where a fibre having a glassy core 1 has a devitrified surface 2 with the stress resulting in a flaw 3, which can be in the form of a pinhole in the fibre surface, or in extreme cases an extended crack (see arrows "C" in FIGS. 6 and 8).

Third Comparative Fibre

Figure 7:
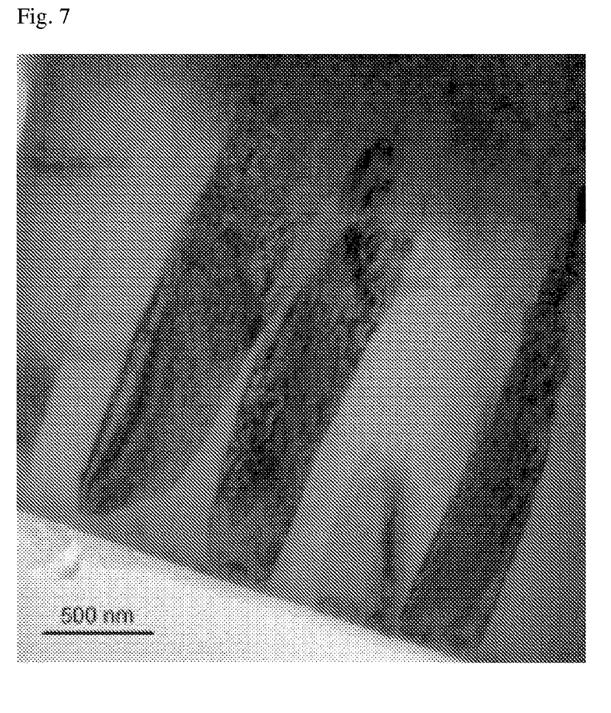
FIG. 7 is a transmission electron microscope image of a comparative fibre

FIG. 7 shows a transmission electron microscope image of a third comparative fibre of approximate composition 26.4 wt % $K_2O$; 36.7 wt % $Al_2O_3$; 34 wt % $SiO_2$ 1.9 wt % MgO; and 0.9 wt % $ZrO_2$ [~22.2 mol % $K_2O$; 28.6 mol % $Al_2O_3$; 44.9 mol % $SiO_2$ 3.7 mol % MgO; and 0.6 mol % $ZrO_2$]. As can be seen, this shows broad crystalline bands extending inwards to the still-glassy core of the fibre [toward the top right of the image]. Such fibres show pinholes after exposure to 1250° C. for 24 hours as shown in FIG. 8.

First Example Fibre

The applicant has found that when zirconia is added in amounts large enough to cause bulk crystallisation a dramatic improvement in properties is provided.

Figure 9:
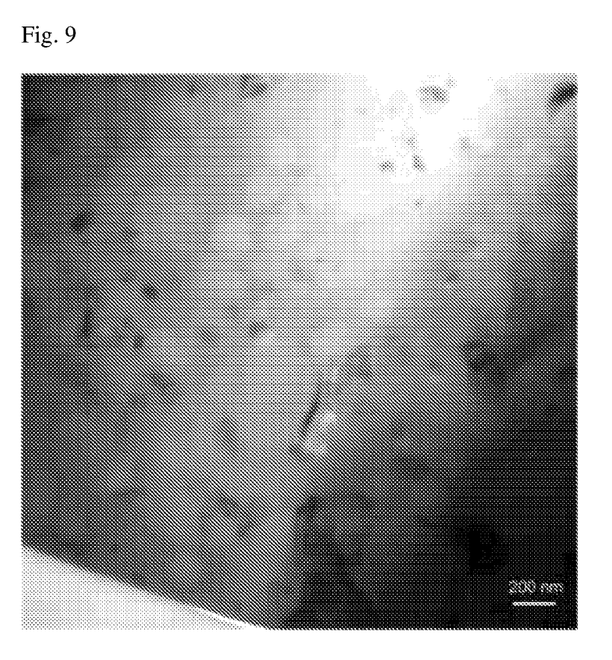
FIG. 9 is a transmission electron microscope image of a fibre of a first composition according to the present invention

FIG. 9 shows a transmission electron microscope image of a fibre of approximate composition 22.8 wt % $K_2O$; 33.8 wt % $Al_2O_3$; 36.3 wt % $SiO_2$; 0.3 wt % $Na_2O$; 0.2 wt % $HfO_2$; 0.1 wt % $Fe_2O_3$; 0.1 wt % MgO; 0.1 wt % $TiO_2$ and 5.8 wt % $ZrO_2$ [~19.7 mol % $K_2O$; 26.9 mol % $Al_2O_3$; 49.0 mol % $SiO_2$ 0.3 mol % $Na_2O$; 0.1 mol % $HfO_2$; <0.1 mol % $Fe_2O_3$; 0.1 mol % MgO; 0.1 mol % $TiO_2$ and 3.8 mol % $ZrO_2$]. This shows smaller crystallites formed in the body of the fibre showing bulk crystallisation.

The effect of the zirconia addition at such levels may be to promote phase separation in the glass (to form regions of different phase), such that this phase separation promotes bulk crystallisation by providing nuclei at the phase interfaces: or the zirconia may be producing crystalline nuclei: or both.

Figure 10:
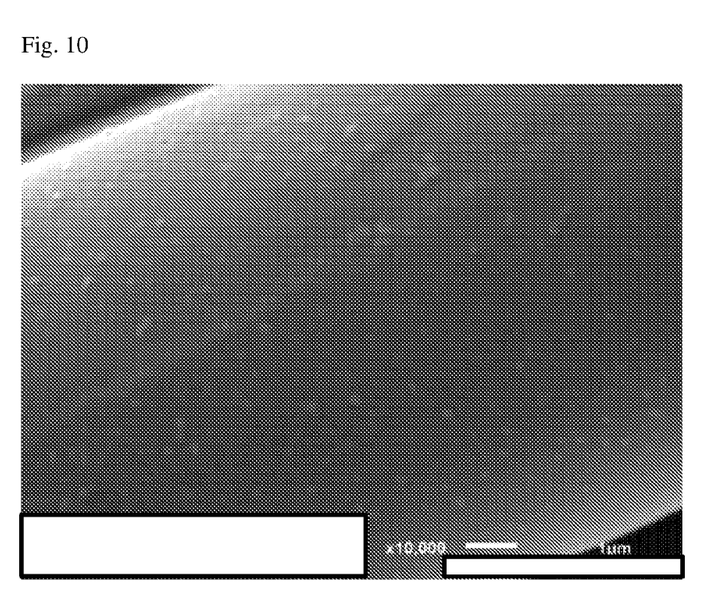
FIG. 10 is a micrograph of a fibre of the composition of FIG. 9 after exposure to 1250° C.

Scanning electron microscope images of the fibres of FIG. 9 show that after exposure to 1250° C. for 24 hours the fibres are free of pinholes [FIG. 10].

The addition of sufficient zirconia to promote bulk crystallisation thus has the effect of relieving the stresses leading to pinhole formation by providing a more uniform devitrification of the fibre.

There is some evidence that phase separation may be occurring, as this level of zirconia appears to have the effect of increasing dissolution rates.

Figure 13:
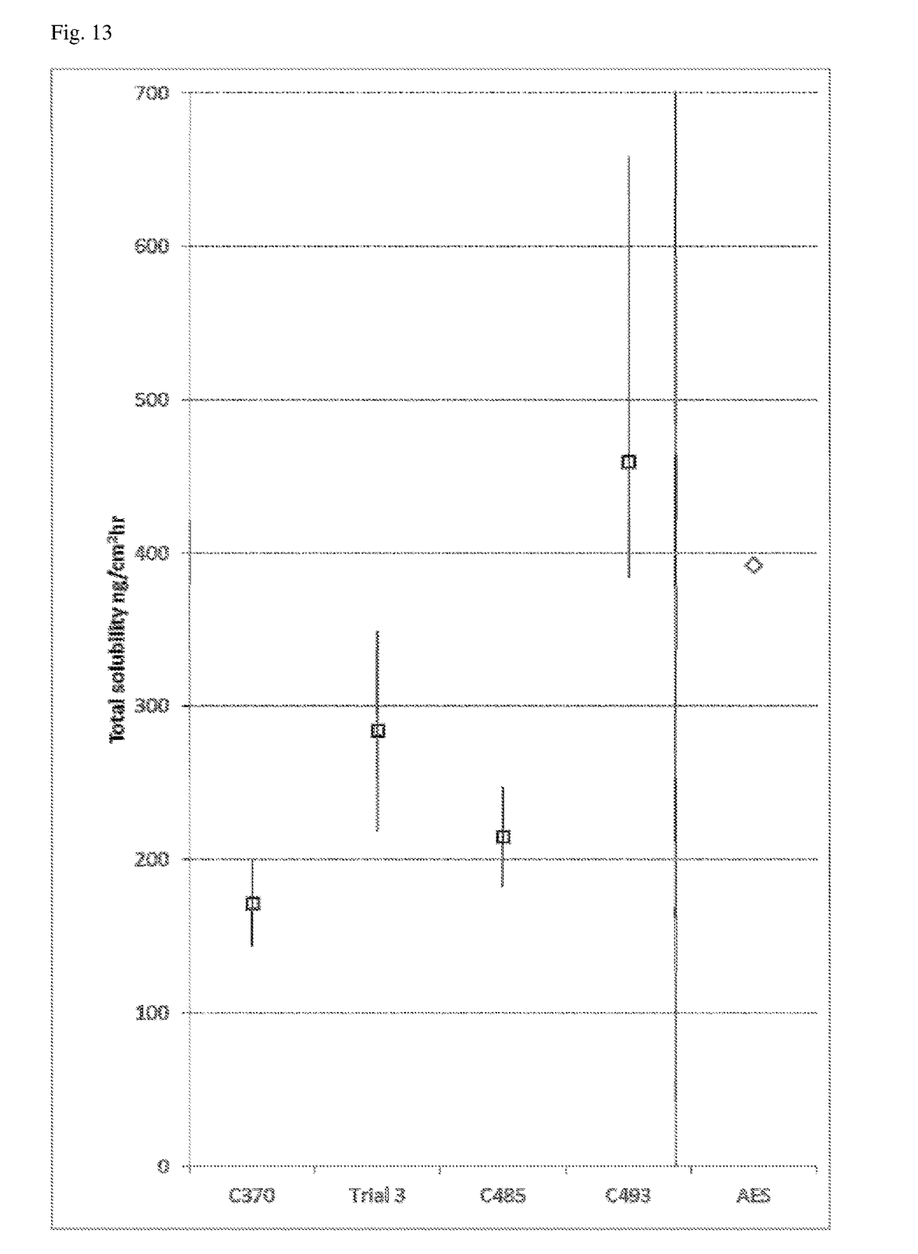
FIG. 13 is a graph indicating relative solubilities between potassium aluminosilicate fibres according to the invention in comparison with potassium aluminosilicate fibres not in accordance with the invention and an alkaline earth silicate fibre.

FIG. 13 shows total solubility rates in a pH4.5 solution [measured in accordance with the procedure set out in WO2008/065363] for fibres of the compositions of Table 1 which comprise four potassium aluminosilicate fibres and one alkaline earth silicate fibre:

TABLE 1

|         | $Al_2O_3$ | $SiO_2$ | $K_2O$ | CaO  | $Fe_2O_3$ | $HfO_2$ | MgO  | $Na_2O$ | $TiO_2$ | $ZrO_2$ | $P_2O_5$ | $Mn_3O_4$ |
|---------|-----------|---------|--------|------|-----------|---------|------|---------|---------|---------|----------|-----------|
| C370    | 39.4      | 34.9    | 25.2   | 0.05 | 0.05      | 0       | 0.05 | 0.29    | 0.03    | 0.1     | 0        | 0         |
| Trial 3 | 36.8      | 33.2    | 26.5   | 0.01 | 0.03      | 0.03    | 2.1  | 0.27    | 0.02    | 1.1     | 0        | 0         |
| C485    | 33.7      | 34.1    | 25.5   | 0.06 | 0.08      | 0.18    | 0.05 | 0.13    | 0.05    | 5.7     | 0        | 0         |
| C493    | 36.1      | 31.7    | 25.5   | 0.03 | 0.07      | 0.19    | 0.05 | 0.14    | 0.05    | 5.9     | 0        | 0         |
| AES     | 17.9      | 42.8    | 0.9    | 21.1 | 7.3       | 0       | 7.1  | 1.6     | 1.7     | 0       | 0.24     | 0.22      |

The high-low and average solubilities of a number of samples are shown for the potassium aluminosilicate fibres: only one measurement was made for the alkaline earth silicate fibre.

C370 has the lowest solubility of the compositions indicated and contains <0.6 wt % of components other than $Al_2O_3$.

Addition of an amount of MgO [2 wt %] and $ZrO_2$ [1 wt %] gives a higher solubility [Trial 3] but at the cost of exacerbating the "pinhole" problem mentioned above.

Addition of more $ZrO_2$ [5.7 wt %] shows a solubility [C485] less than the 1 wt % $ZrO_2$ fibre and still produces a fibre that tends to have pinholes.

When a fibre according to the present invention is used [C493] a dramatic increase in solubility is demonstrated even though the difference in $ZrO_2$ content [5.9 wt %] is only 0.2 wt % different from C485.

It should be noted by comparison with the alkaline earth silicate fibre, that the fibres of the example C493 have very good solubility.

Addition of a nucleation promoting material such as zirconia, in an amount that appears sufficient to cause such phase separation, thus not only reduces the propensity for pinhole formation, it also increases solubility of the fibres.

This latter effect is believed to be independent of the composition of the fibre and the applicant reserves the right to claim generally, inorganic fibres formed as an oxide glass having a composition comprising glass forming elements and an amount of a nucleation promoting component effective to promote phase separation in the glass. By oxide glass in this context is meant a glass in which oxygen atoms constitute more than 50 mol % of the glass composition.

It should be noted that other nucleation promoting components, for example such as ceria, titania, or phosphate, are likely to at least co-operate with zirconia to the extent that less than 5.9 wt % zirconia mentioned above may be sufficient if combined with such a nucleation promoting component. The applicants have shown that titania when used instead of zirconia (or in large quantities in combination with zirconia) reduces the melting point of the potassium aluminosilicate fibres to a level that is not suited to most higher temperature applications [e.g. applications requiring continuous exposure to 1200-1300° C.], although such compositions may be of use for lower temperature applications, such as support mats for catalytic converters.

Second Example Fibre

Figure 11:
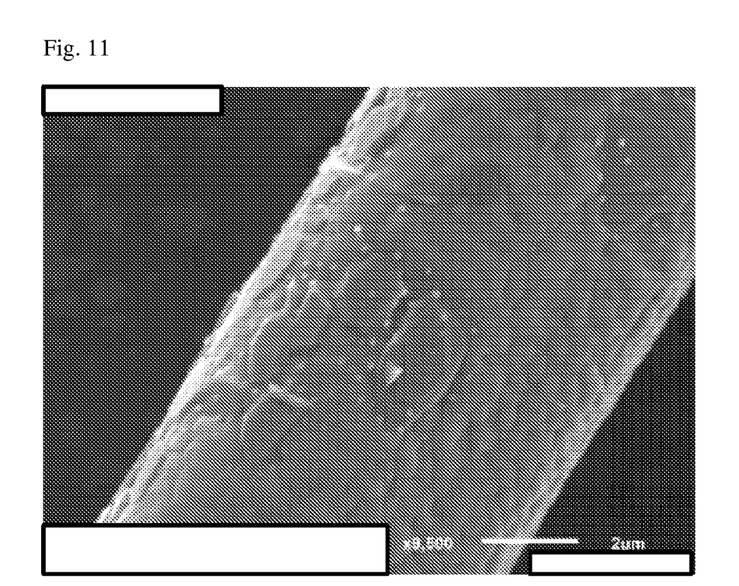
FIG. 11 is a further micrograph of a fibre of the composition of FIG. 9 after exposure to 1400° C.

The first example fibre is still inclined to produce high alumina plates at higher temperature. FIG. 11 shows the first example fibre after exposure to 1400° C. for 24 hours showing the formation of such plates.

As mentioned above, MgO was disclosed in WO2009/066076 as a beneficial additive in low quantities, as magnesium acts as a grain refining agent, reducing the effect on the fibres of crystallisation of large crystals. However, it was found by the applicants that magnesium appears to contribute to failure through the "pinhole" mechanism since it accelerates crystallisation and hence increases the stresses caused during crystallisation.

However, the applicants have found that when bulk crystallisation occurs magnesium does not have this detrimental effect, and indeed has the positive effects of reducing plate formation on the fibres and increasing resiliency for fibres exposed to 1200° C. or more for extended periods.

Figure 12:
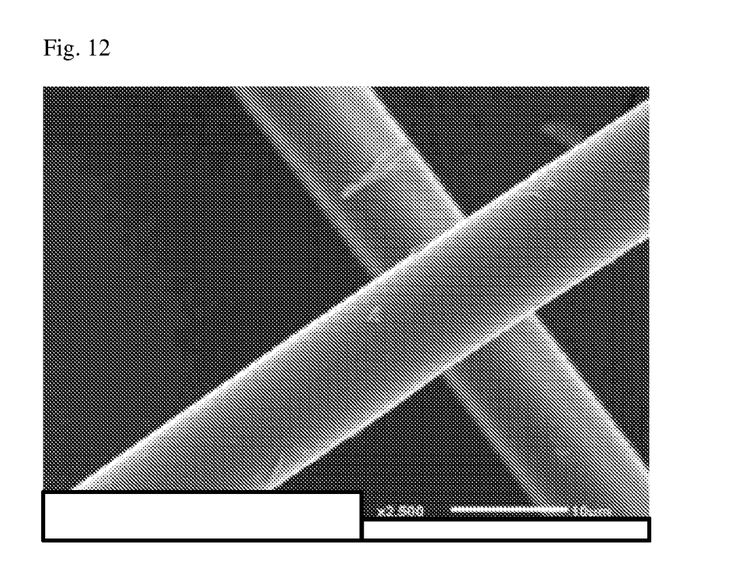
FIG. 12 is a micrograph of a fibre of a second composition according to the present invention after exposure to 1400° C.

FIG. 12 shows a fibre having the approximate composition 23.1 wt % $K_2O$; 36.0 wt % $Al_2O_3$; 31.4 wt % $SiO_2$; 2 wt % MgO; and 6.3 wt % $ZrO_2$ [~20.1 mol % $K_2O$; 29.0 mol % $Al_2O_3$; 42.8 mol % $SiO_2$ 4.0 mol % MgO; and 4.2 mol % $ZrO_2$] after exposure to 1400° C. for 24 hours. As can be seen the fibre is smooth and shows no major sign of plate formation, in contrast with the first example fibre.

Where there is no magnesia the mechanical strength of the fibres at 1400° C. is poor.

Such fibres have a much reduced propensity to form a "soft zone" when used in a body of fibres (e.g. blanket or modules, including folded blanket modules and blocks).

Further Example Fibres

The applicants have investigated a range of fibres to determine the effect of zirconia and magnesia on properties. The effect of zirconia in reducing pinhole formation has been demonstrated with zirconia contents up to 13-14 wt % but at such high levels some surface melting of fibres was observed, that the applicants hypothesize may be due to formation of compounds with other components of the fibres.

Further, with increasing zirconia content the propensity to form high alumina plates at 1400° C. appears to increase. Accordingly, to minimise the potential for this effect to occur, levels of zirconia below 13 wt %, or below 11 wt % or below 9 wt % or below 7 wt % may be preferred.

The effect of magnesia on reducing high alumina plate formation has been demonstrated with a number of compositions. However, although magnesium reduces the propensity to form plates it has also been found to reduce the resistance of fibres to high temperatures, such that the shrinkage of fibres containing magnesia tends to increase with increasing magnesia content.

For $K_2O$ contents <24 wt % the shrinkage of the fibres tends to be higher at 1400° C. than for fibres with 24 wt % or more $K_2O$.

For $Al_2O_3$ contents >38 wt % formation of the high alumina plates appears to be promoted. For $SiO_2$ contents >33 wt % viscosity of the melt increases, tending to lead to production of coarse fibres.

To balance these effects and for fibres intended for high temperature applications [e.g. 1200-1300° C. continuous use temperature] a typical compositional range might be [in weight percent]:

$Al_2O_3$ 36±1.5 wt %
$K_2O$ 25.5±1.5 wt %
$SiO_2$ 31±1.5 wt %
$ZrO_2$ 6.5±0.5 wt %
MgO 1±0.2 wt %
with the total of these components being 99%-100% by weight.

However, it should be noted that compositions outside this range are also useful in high temperature applications, for example by partial substitution of $ZrO_2$ as mentioned above.

For less demanding applications where performance at such high temperatures is not required, such as support mats for catalytic converters, other characteristics such as the resilience of the fibres may be more important than maximum use temperature. For such applications MgO contents of, for example, 3 wt % may be useful.

Heat Treatment

The applicants have further found that potassium aluminosilicate fibres are amenable to heat treatment to induce crystallisation and hence increase the ability of the fibres to hold stress at elevated temperatures below the crystallisation temperature of the fibres, which is typically above 850° C., such as those experienced in catalytic converter applications, for example in the range 600-850° C. The fibres comprising nucleation promoting components (for example such as $ZrO_2$), and optional MgO additives, are particularly useful in this respect.

As can be appreciated such heat treatment can be used with the bulk crystallised fibres described above.

For applications requiring resilience in the fibres [e.g. support mats for catalytic converters] it is beneficial that partial crystallisation of the fibre occur before use. This is because a wholly vitreous fibre can flow under pressure and crystallising the fibre in part resists this flow. A crystalline content of 15-50% by weight is generally sufficient with a crystal content in the range 15-30% being preferred although more than 50% may be tolerated. Additionally, small crystals are preferred, with a crystal size of less than 250 nm, preferably less than 150 nm, more preferably less than 50 nm being advantageous. A heating regime of 2-60 minutes at temperatures between 900° to 1200° C. [with higher temperature requiring shorter times] should suffice to give a crystalline content in the range 15-50% but at the low end of the temperature range long times will be required. One of the effects of magnesium addition is to reduce the time required at a given temperature, or the temperature required for a given time.

The applicant therefore discloses partially crystallised inorganic fibres having a composition comprising:

10≤$Al_2O_3$≤50 mol %;
12≤$K_2O$≤40 mol %;
30≤$SiO_2$≤70 mol %;

and having a crystalline content of 15-50% by weight, or 15-30% by weight, and having a crystal size of less than 250 nm, or less than 150 nm, or less than 50 nm or any combination of these parameters. Such compositions may be claimed in a subsequent divisional application.

The effect of magnesia on non-bulk crystallised fibres was demonstrated by comparing fibres heat treated by placing in a furnace at the specified temperature and removing the samples after the specified time. Table 2 shows the weight percentage of kalsilite and leucite present determined by x-ray diffraction and the grain size determined by using the Scherrer equation for peak broadening. The instrumental contribution to the peak broadening was evaluated using the peak width of a NIST 1976a corundum standard taken over the same angular range.

As can be seen, heat treatment of the fibre A [which contained no zirconia or magnesia] at 1050° C. for period ranging from 2 to 10 minutes resulted in very little kalsilite formation. In contrast the fibre B which contained MgO and $ZrO_2$ showed over 8 times as much when treated at 1050° C. for 5 minutes.

Tests of crystallisation following heat treatment at temperatures ranging from 1000° C. to 1250° C. showed that 20 minutes was an adequate time to crystallise more than 5% of the fibre as kalsilite.

TABLE 2

| | Kalsilite % | Kalsilite size [nm] | Leucite % | Leucite size (nm) |
|---|---|---|---|---|
| Fibre A 1050° C./2 minutes | 0.6 | 59.2 | | |
| Fibre A 1050° C./5 minutes | 1.8 | 44.6 | | |
| Fibre A 1050° C./10 minutes | 0.5 | 70.2 | | |
| Fibre B 1050° C./5 minutes | 15.4 | 52.9 ± 15.8 | | |
| Fibre B 1000° C./20 minutes | 9.2 | 54.1 ± 13.7 | | |
| Fibre B 1050° C./20 minutes | 26.3 | 53.2 ± 15.0 | | |
| Fibre B 1100° C./20 minutes | 31.2 | 51.0 ± 13.3 | | |
| Fibre B 1250° C./20 minutes | 35.2 | 44.3 ± 10.0 | 1.0 | 26.0 |
| Fibre B 1250° C./24 hours | 29.3 | 54.2 ± 15.0 | 25.0 | 20.3 ± 6.2 |

Different heat treatment regimes will be required for different compositions, and need to be determined experimentally.

The fibres of WO2008/065363 and WO2009/066076 tend to be fully crystalline and dense within 24 hours of continuous exposure to 1000° C. and so alternatively, heat treating the fibres to condition them prior to repeated short term exposures to temperature may be effective in ameliorating degradation of fibres. A time as short as 4 hours may provide protection but times in excess of 6 hours, 8 hours, 12 hours, 16 hours, 20 hours, or even 24 hours may provide improved protection.

However, this is not accompanied by the reduction in pinholes achieved through addition of nucleation promoting components in an amount effective to promote bulk crystallisation.

It should be noted that the fibres of the present invention do not form crystalline silica on firing.

Annealing at temperatures insufficient to cause crystallisation can also be of benefit. U.S. Pat. No. 5,250,269 disclosed that annealing alkaline earth silicate fibres in conditions that retained the amorphous nature of the fibres is of benefit to the mechanical properties of the fibres, and disclosed that the heat treatment can be below the devitrification temperature of the fibres, or above the devitrification temperature of the fibres but for a very short time, provided that the fibre remained substantially amorphous. The applicants have determined that the fibres of the present invention also benefit from annealing in this manner. The applicants hypothesize that the extreme conditions inherent in the formation of melt-formed fibres results in flaws in the fibres, and that annealing "heals" these flaws. Other mechanisms (for example initiation of some degree of ordering within the glass) may also be involved.

Table 3 below shows the result of testing fibres having the approximate composition:

$Al_2O_3$ 36±1.5 wt %

$K_2O$ 25.5±1.5 wt %

$SiO_2$ 31±1.5 wt %

$ZrO_2$ 6.5±0.5 wt %

MgO 1±0.2 wt % in a hot compression test in which:

70 g samples of bulk fibre were formed by a casting from a slurry into a sheet of dimensions 25 cm×17 cm [a "handsheet"]

circles of 50 mm diameter were cut from the handsheet and their density calculated from the thickness of the samples and their weight the samples were compressed to a density of 0.650 g·cm$^{-3}$ between two quartz platens supported by quartz rods in a split tube furnace mounted in an Intron 5582 mechanical testing machine and arranged to permit force to be transmitted by the quartz rods to the quartz platens;

pressure on the rods was measured during compression;

once the desired density was reached, the temperature was ramped up and the pressure recorded over time.

The pressure is reported in Table 3 as a calculated compressive strength.

TABLE 3

| | | \multicolumn{6}{c}{Annealing Time (mins)} | | | | | |
|---|---|---|---|---|---|---|---|
| | | 0 | 5 | 8 | 10 | 15 | 20 |
| | | \multicolumn{6}{c}{Strength at 700° C. (kPa)} | | | | | |
| | Unannealed | 145.13 | | | | | |
| Annealing | 850° C. | | | | | 233.6167 | |
| Temperature | 875° C. | | | | 216.25 | | 205.4 |
| | 900° C. | | 248.22 | 222.2 | 270.34 | 261.195 | 197.09 |
| | 1000° C. | | 130.275 | | | | |
| % | 850° C. | | | | | 61% | |
| improvement | 875° C. | | | | 49% | | 42% |
| | 900° C. | | 71% | 53% | 86% | 80% | 36% |
| | 1000° C. | | −10% | | | | |
| | | \multicolumn{6}{c}{Strength at 800° C. (kPa)} | | | | | |
| | Unannealed | 103.12 | | | | | |
| Annealing | 850° C. | | | | | 148.8363 | |
| Temperature | 875° C. | | | | 184.705 | | 171.4 |
| | 900° C. | | 194.27 | 190.605 | 234.05 | 168.625 | 217.56 |
| | 1000° C. | | 113.105 | | | | |
| % | 850° C. | | | | | 44% | |
| improvement | 875° C. | | | | 79% | | 66% |
| | 900° C. | | 88% | 85% | 127% | 64% | 111% |
| | 1000° C. | | 10% | | | | |
| | | \multicolumn{6}{c}{Strength at 900° C. (kPa)} | | | | | |
| | Unannealed | 62.445 | | | | | |
| Annealing | 850° C. | | | | | 132.3527 | |
| Temperature | 875° C. | | | | 118.12 | | 102.37 |
| | 900° C. | | 104.1 | 128.04 | 151.46 | 135.3 | 118.53 |
| | 1000° C. | | 77.945 | | | | |
| % | 850° C. | | | | | 112% | |
| improvement | 875° C. | | | | 89% | | 64% |
| | 900° C. | | 67% | 105% | 143% | 117% | 90% |
| | 1000° C. | | 25% | | | | |

As can be seen from Table 3, the applicants have confirmed by testing that annealing at temperatures which are below the devitrification temperature [around 960-980° C.] can be of benefit in improving the compressive strength at temperatures of 700° C., 800° C. and 900° C., with the greatest beneficial effect being seen at 900° C.

An increase in compressive strength at 900° C. of over 50% above unannealed fibres is shown for all samples except those annealed at 1000° C. [above the devitrification temperature]. For those annealed at 900° C. for periods in the range 8-15 minutes, an increase in compressive strength at 900° C. of over 100% above unannealed fibres is shown.

Annealing at 850° C. to 900° C. for times ranging from 5-20 minutes have been shown beneficial to varying degrees, but temperatures and times outside this range can be of use, and for different fibres differing annealing regimes may apply.

Generally, annealing at temperatures up to 200° C. or more below the devitrification temperature may assist, but the further from the devitrification temperature the longer the annealing takes. Conveniently the temperature is as close to the devitrification temperature as can be controllably achieved, since this permits the shortest annealing times. Suitable ranges of times include but are not restricted to 30 seconds at a temperature close to the devitrification temperature to 30 days at a temperature far below the devitrification temperature: but times in the range 5 minutes to 1 hour, e.g. 8 minutes to 15 minutes are more manageable.

Suitable ranges of temperatures include but are not restricted to 5° C. below devitrification temperature to 200° C. below devitrification temperature: but temperatures in the range 20° C. below devitrification temperature to 150° C. below devitrification temperature, for example 50° C. below devitrification temperature to 100° C. below devitrification temperature are convenient.

For example, for the composition mentioned above, annealing at 900±50° C. for 1-60 minutes (shorter times for higher temperatures and longer times for lower temperatures) may be used.

As indicated above, annealing at temperatures above the devitrification temperature but for very short times may also provide a useful, non-crystallising, effect however such processes are much more difficult to control.

The effect of annealing is of general applicability and applies also to fibres not encompassed by this application. The applicants reserve the right to claim the annealing methods disclosed in the present or a divisional application.

Fibre Formation and Properties

An additional feature of the addition of nucleation promoting components is that they affect viscosity and surface tension of the melt and can act as a fiberisation aid producing superior [for some applications] properties in the fibres. $ZrO_2$ has been found particularly effective in this role.

The spun fibres described above were formed using a 20 cm (8") rotor at 12,000 rpm [equivalent to a centripetal acceleration of about 158 km/s$^2$]. It should be noted that increasing the accelerations used is known to produce finer fibres. For example U.S. Pat. No. 4,238,213 discloses rotor speeds corresponding to centripetal accelerations of 81 km/s$^2$, ~113.8 km/s$^2$, and ~164.7 km/s$^2$; indicates that higher speed are contemplated; and which indicates that higher speeds give finer fibre diameters for aluminosilicate fibres. Others have proposed high speed rotors for alkaline earth silicate fibres [WO 2012/132287] based on the physics of the spinning process. Thus increasing either or both of the speed or diameter of the rotors may be of advantage. The applicants have spun using a 20 cm (8") rotor at 15,000 rpm [equivalent to a centripetal acceleration of about 247 km/s$^2$].

Potential Uses

The fibres of the present invention can be used, subject to meeting relevant performance criteria, for any purpose for which fibrous inorganic materials, and particularly alkaline earth silicate and aluminosilicate materials, have been used heretofore; and may be used in future applications where the fibre properties are appropriate. In the following reference is made to a number of patent documents relating to applications in which the fibres may be used, subject to meeting relevant performance criteria for the application. The fibres of the present invention can be used in place of the fibres specified in any of these applications subject to meeting relevant performance criteria.

For example, the fibres may be used as:
bulk materials;
deshotted materials [WO2013/094113];
in a mastic or mouldable composition [WO2013/080455, WO2013/080456] or as part of a wet article [WO2012/132271];
as a constituent in needled or otherwise entangled [WO2010/077360, WO2011/084487] assemblies of materials, for example in the form of blanket, folded blanket modules, or high density fibre blocks [WO2013/046052];
as a constituent of non-needled assemblies of materials, for example felts, vacuum formed shapes [WO2012/132469], or papers [WO2008/136875, WO2011/040968, WO2012/132329, WO2012/132327];
as a constituent (with fillers and/or binders) of boards, blocks, and more complex shapes [WO2007/143067, WO2012/049858, WO2011/083695, WO2011/083696];
as strengthening constituents in composite materials such as, for example, fibre reinforced cements, fibre reinforced plastics, and as a component of metal matrix composites;
in support structures for catalyst bodies in pollution control devices such as automotive exhaust system catalytic converters and diesel particulate filters [WO2013/015083], including support structures comprising:
  edge protectants [WO2010/024920, WO2012/021270];
  microporous materials [WO2009/032147, WO2011019394, WO2011/019396];
  organic binders and antioxidants [WO2009/032191];
  intumescent material [WO2009/032191];
  nanofibrillated fibres [WO2012/021817];
  microspheres [WO2011/084558];
  colloidal materials [WO2006/004974, WO2011/037617]
  oriented fibre layers [WO2011/084475];
  portions having different basis weight [WO2011/019377];
  layers comprising different fibres [WO2012065052];
  coated fibres [WO2010122337];
  mats cut at specified angles [WO2011067598];
  [NB all of the above features may be used in applications other than support structures for catalytic bodies]
  in the form of an end cone [e.g. U.S. Pat. No. 6,726,884, U.S. Pat. No. 8,182,751]
as a constituent of catalyst bodies [WO2005/110578, WO2010/074711, WO2010/092668, WO2013/145243, WO2013/145245];
as a constituent of friction materials [e.g. for automotive brakes [JP56-16578]];
for fire protection [WO2011/060421, WO2011/060259, WO2012/068427, WO2012/148468, WO2012/148469, WO2013074968]; and optionally in combination with one or more intumescent materials, endothermic materials, or both intumescent and endothermic materials
as insulation, for example;
  as insulation for ethylene crackers [WO2009/126593], hydrogen reforming apparatus [U.S. Pat. No. 4,690,690];
  as insulation in furnaces for the heat treatment of metals including iron and steel [U.S. Pat. No. 4,504,957];
  as insulation in apparatus for ceramics manufacturing.

The fibres may also be used in combination with other materials. For example the fibres may be used in combination with polycrystalline (sol-gel) fibres [WO2012/065052] or with other biosoluble fibres [WO2011/037634].

Bodies comprising the fibres may also be used in combination with bodies formed of other materials. For example, in insulation applications, a layer of material according to the present invention [for example a blanket or board] may be secured to a layer of insulation having a lower maximum continuous use temperature [for example a blanket or board of alkaline earth silicate fibres] [WO2010/120380, WO2011133778]. Securing of the layers together may be by any known mechanism, for example blanket anchors secured within the blankets [U.S. Pat. No. 4,578,918], or ceramic screws passing through the blankets [see for example DE3427918-A1].

Treatment of the Fibres

In formation of the fibres or afterwards they may be treated by applying materials to the fibres.

For example:—
lubricants may be applied to the fibres to assist needling or other processing of the fibres;
coatings may be applied to the fibres to act as binders;
coatings may be applied to the fibres to provide a strengthening or other effect, for example phosphates [WO2007/005836] metal oxides [WO2011159914] and colloidal materials such as alumina, silica and zirconia [WO2006/004974];
binders may be applied to the fibres to bind the fibres subsequent to incorporation in a body comprising such fibres.

It has been found in particular that the application of colloidal silica can help in suppressing the formation of a "soft zone" within the material [of the type that in its extreme leads to the behaviour shown in FIG. 4].

Figure 14:
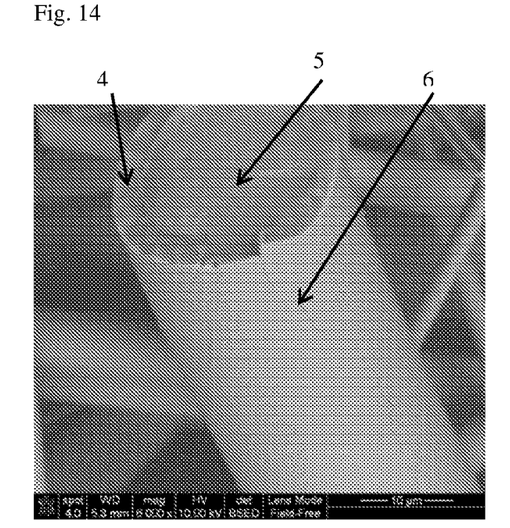
FIG. 14 is a micrograph of fibres that have been exposed to conditions leading to a "soft zone" in a body of insulation (e.g. blanket or modules, including folded blanket modules and blocks).
Figure 15:
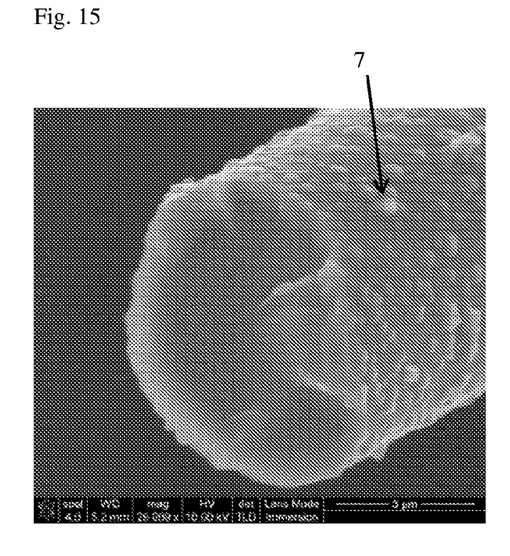
FIG. 15 is a micrograph of treated fibres that have been exposed to conditions normally leading to a "soft zone" in a body of insulation (e.g. blanket or modules, including folded blanket modules and blocks).

FIGS. 14 and 15 show representative micrographs of fibres that have been exposed to conditions leading to a "soft zone" in a body of insulation (e.g. blanket or modules, including folded blanket modules and blocks). The fibres are of approximate composition:

$Al_2O_3$ 36±1.5 wt %
$K_2O$ 25.5±1.5 wt %
$SiO_2$ 31±1.5 wt %
$ZrO_2$ 6.5±0.5 wt %
MgO 1±0.2 wt %.

As shown in the left of FIG. 14, a fibre has a devitrified outer layer 4 which surrounds a glassy core 5 and shows some limited cracking 6. As show in FIG. 15, a fibre shows crystallites 7 formed at the surface of the fibre.

The composition has a lower propensity to form pinholes than fibres outside the invention, and does not exhibit the catastrophic failure mode shown in FIG. 4. However the cracking shown by some fibres from the "soft zone" does lead to some weakness compared with fibres from outside the "soft zone".

The applicants have found that the composition of the devitrified outer layer differs from that in the core of the fibre and hypothesize that potassium migration leads to a change in composition sufficient to trigger some surface crystallisation. A major cause of the soft zone appears to be potassium evolution at the hot face moving back into a body of fibres and depositing on the fibres below the bulk crystallisation temperature of the fibre [as witness crystallites 7]. The bulk crystallisation temperature is typically around 960-980° C. Additionally, potassium migration to the surface may also contribute to providing potassium rich deposits 7 at the surface.

The potassium rich deposits at the surface appear to promote surface crystallisation.

It has been found that this effect can be mitigated by coating the fibres with a material to scavenge the potassium. In particular, a coating comprising a source of silica results in the formation at the fibre surface of leucite crystals [$K_2O.Al_2O_3.4SiO_2$]. Leucite has a density of ~2.47 g·cm$^{-3}$, more closely matching the density of the melt (~2.5 g·cm$^{-3}$) than does kalsilite [$K_2O.Al_2O_3.2SiO_2$]; (2.6-2.62 g·cm$^{-3}$). This closer density match means that such surface crystallisation as occurs is less likely to result in cracks and weakness in the fibres.

Figure 16:
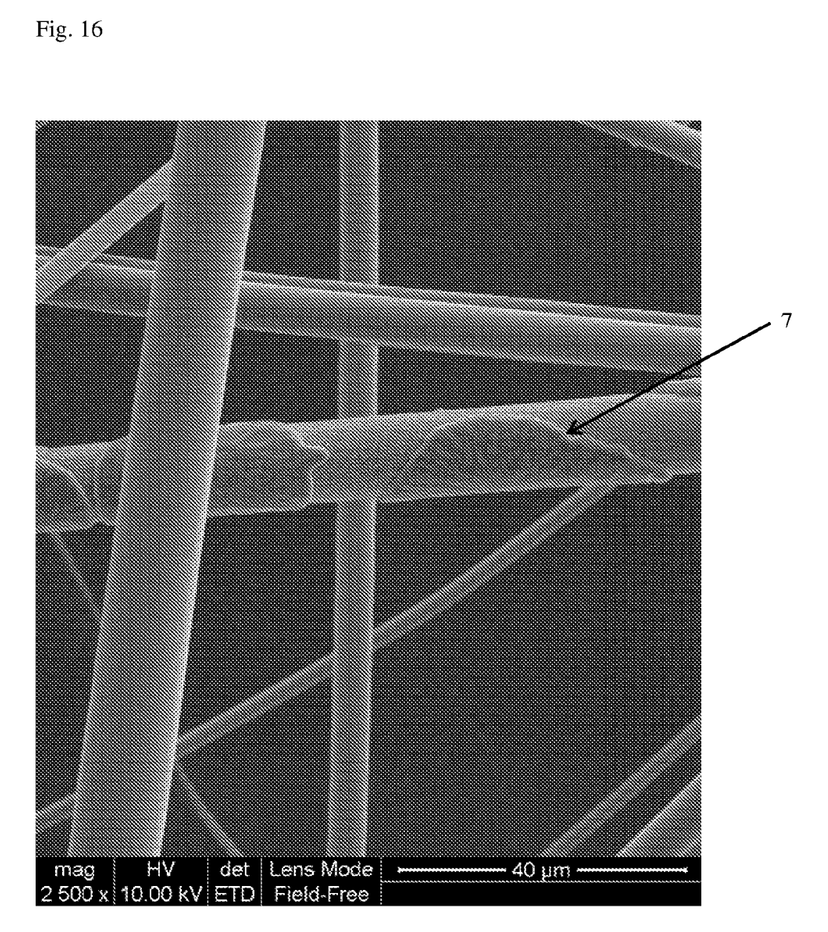
FIG. 16 is a micrograph of fibers that have been exposed to conditions that formed a soft zone with untreated (e.g. blanket or modules, including folded blanket modules and blocks).

FIG. 16 shows fibres from a blanket of fibres (of the same fibre composition as FIG. 14), that has been treated by immersion in a 2 wt % solids colloidal silica, drained, dried, formed into a folded blanket module, and then fired at 1200° C./1 hr for 30 cycles [conditions that formed a soft zone with untreated fibre]. The blanket had a silica loading of approximately 0.6 wt %.

After firing it was found that no soft zone formed, and it can be seen that the fibres are crack free. It should be noted that plaques 8 can be seen on the surface of the fibre. Complete coating of the fibre is not necessary to achieve the desired effect as surface migration of silica is likely to occur at the temperatures normally leading to a soft zone [typically around 900° C.].

Sufficient silica source needs to be applied to achieve the desired effect. The amount of silica source added may be, for example and expressed as wt % equivalent silica content based on the amount of fibre [i.e. equivalent silica content/ amount of fibre], >0.1 wt %, >0.2 wt %, >0.3 wt %, >0.4 wt %, >0.5 wt %, >0.6 wt %, >0.8 wt %, >0.9 wt %, >1.0 wt %, >1.2 wt %, >1.4 wt %, >1.6 wt %, >1.8 wt %, >2.0 wt %, >2.5 wt %, >3.0 wt %, >4.0 wt.

Convenient ranges include 0.25 wt % to 2.5 wt % and 0.5% to 1.5 wt %.

Surface coating and provision of a nucleation promoting component address the mismatch between the densities of kalsilite and the bulk glass in different ways:
provision of a nucleation promoting component addresses the problem by promoting bulk crystallisation over surface crystallisation
surface coating addresses the problem by scavenging potassium
use of a silica source as a potassium scavenger promotes surface formation of leucite rather than kalsilite.

Potassium scavenging and surface coating/enrichment with a source of silica thus may be used independently or together with provision of a nucleation promoting component effective to promote bulk crystallisation in the glass.

Although silica sources are particularly advantageous for potassium scavenging, other materials that lock up the potassium [e.g. by forming high melting point compounds] may also be used. The source of silica may comprise one or more sources and may be a colloidal silica or a silica precursor, for example compounds of silicon (e.g. silanes, siloxanes, silazines) or mixtures thereof. Components other than silica may be included in the one or more sources of silica [for example alumina].

The surface coating/enrichment may be applied by any suitable means, for example:
immersion in liquid or suspension comprising a source of silica
spraying with a liquid or suspension comprising a source of silica
exposure to a gaseous source of silica
and may occur during fibre formation; after fibre formation on the fibres; after fibre formation on bodies comprising the fibres. A convenient way is by spraying with the lubricant conventionally applied after fibre formation.

Many variants, product forms, uses, and applications of the fibres of the present invention will be apparent to the person skilled in the art and are intended to be encompassed by this invention.

By providing biosoluble fibres having maximum continuous use temperature higher than alkaline earth silicate fibres, the present invention extends the range of applications for which biosoluble fibres may be used. This reduces the present need, for many applications, to use fibres that are not biosoluble.

The invention claimed is:
1. Inorganic fibres formed as a glass having a composition comprising:—
$10 \leq Al_2O_3 \leq 50$ mol %;
$12 \leq K_2O \leq 40$ mol %;
$30 \leq SiO_2 \leq 70$ mol %; and
an amount of a nucleation promoting component effective to promote bulk crystallisation in the glass;
in which $SiO_2+Al_2O_3+K_2O \geq 80$ mol % and with the total constituents not exceeding 100 mol %.
2. Inorganic fibres, as claimed in claim 1 in which $20 \leq Al_2O_3 \leq 35$ mol %.
3. Inorganic fibres, as claimed in claim 2 in which $23 \leq Al_2O_3 \leq 33$ mol %.
4. Inorganic fibres, as claimed in claim 3 in which $25 \leq Al_2O_3 \leq 31$ mol %.
5. Inorganic fibres, as claimed in claim 1 in which $15 \leq K_2O \leq 30$ mol %.
6. Inorganic fibres, as claimed in claim 5, in which $17 \leq K_2O \leq 25$ mol %.
7. Inorganic fibres, as claimed in claim 6, in which $20 \leq K_2O \leq 24$ mol %.
8. Inorganic fibres, as claimed in claim 1, in which $35 \leq SiO_2 \leq 60$ mol %.
9. Inorganic fibres, as claimed in claim 8 in which $40 \leq SiO_2 \leq 50$ mol %.
10. Inorganic fibres, as claimed in claim 9 in which $40 \leq SiO_2 \leq 45$ mol %.
11. Inorganic fibres, as claimed in claim 1, in which $SiO_2+Al_2O_3+K_2O \geq 85$ mol %.
12. Inorganic fibres, as claimed in claim 11, in which $SiO_2+Al_2O_3+K_2O \geq 90$ mol.
13. Inorganic fibres, as claimed in claim 12, in which $SiO_2+Al_2O_3+K_2O \geq 95$ mol %.
14. Inorganic fibres, as claimed in claim 1, in which the composition further comprises magnesia.
15. Inorganic fibres, as claimed in claim 14 in which $0.2 \leq MgO \leq 5$ mol %.

16. Inorganic fibres, as claimed in claim 15 in which 0.5≤MgO ≤4 mol %.

17. Inorganic fibres, as claimed in claim 16 in which 1≤MgO ≤3 mol %.

18. Inorganic fibres, as claimed in claim 1, in which the component capable of promoting bulk crystallisation is or includes zirconia, ceria, titania, phosphate, or mixtures thereof.

19. Inorganic fibres, as claimed in claim 18, in which the component capable of promoting bulk crystallisation is or includes zirconia.

20. Inorganic fibres, as claimed in claim 19, in which:—
3≤$ZrO_2$≤10 mol %.

21. Inorganic fibres, as claimed in claim 20, in which:—
3.5 mol %≤$ZrO_2$≤10 mol %.

22. Inorganic fibres, as claimed in claim 20, in which:—
$ZrO_2$≤9 mol %.

23. Inorganic fibres, as claimed in claim 22, in which:—
$ZrO_2$≤7 mol %.

24. Inorganic fibres, as claimed in claim 23, in which:—
$ZrO_2$≤5 mol %.

25. Inorganic fibres, as claimed in claim 1, that are melt formed and have been annealed at a temperature between 200° C. below a devitrification temperature for the fibres and the devitrification temperature for the fibres.

26. Inorganic fibres, as claimed in claim 25, in which the fibres have been annealed at a temperature and time sufficient to show an improvement in compressive strength at 900° C. of over 50% above unannealed fibres.

27. Inorganic fibres, as claimed in claim 26, in which the fibres have been annealed at a temperature and time sufficient to show an improvement in compressive strength at 900° C. of over 100% above unannealed fibres.

28. Thermal insulation comprising inorganic fibres as claimed in claim 1.

29. Thermal insulation, as claimed in claim 28, in which the insulation is in the form of a blanket of needled or otherwise entangled fibres.

30. Mastics comprising inorganic fibres as claimed in claim 1.

31. Composite materials comprising inorganic fibres as claimed in claim 1.

32. Papers comprising inorganic fibres as claimed in claim 1.

33. Support structures for catalyst bodies, the structures comprising inorganic fibres as claimed in claim 1.

34. Friction materials comprising inorganic fibres as claimed in claim 1.

35. Catalyst bodies comprising inorganic fibres as claimed in claim 1.

36. Fibre blends comprising inorganic fibres as claimed in claim claim 1.

37. Fibre blends as claimed in claim 36, in which the other fibres are or include polycrystalline fibres.

38. Inorganic fibres having a composition in weight percent:—
$Al_2O_3$ 36±1.5 wt %
$K_2O$ 25.5±1.5 wt %
$SiO_2$ 31±1.5 wt %
$ZrO_2$ 6.5±0.5 wt %
MgO 1±0.2 wt %
with the total of these components being 99%-100% by weight.

39. Inorganic fibres formed as a glass having a composition comprising:—
10≤$Al_2O_3$≤50 mol %;
12≤$K_2O$≤40 mol %;
30≤$SiO_2$≤70 mol %; an amount of a nucleation promoting component effective to promote bulk crystallisation in the glass;
the fibres bearing on at least part of their surface one or more potassium scavenging materials.

40. Inorganic fibres, as claimed in claim 39 in which the potassium scavenging materials comprise one or more sources of silica.

41. Inorganic fibres, as claimed in claim 40, in which the one or more sources of silica comprise a colloidal silica.

42. Inorganic fibres formed as a glass having a composition comprising:—
25≤$Al_2O_3$≤31 mol %;
20≤$K_2O$≤24 mol %;
40≤$SiO_2$≤45 mol %;
3.5 mol %≤$ZrO_2$≤7 mol %;
1≤MgO ≤3 mol %
in which $SiO_2+Al_2O_3+K_2O$≥80 mol % and with the total constituents not exceeding 100 mol %.

* * * * *